United States Patent [19]

Skalski

[11] Patent Number: 5,749,444
[45] Date of Patent: May 12, 1998

[54] CONTACTLESS SLIDE GUIDE FOR ELEVATORS

[75] Inventor: Clement A. Skalski, Avon, Conn.

[73] Assignee: Otis Elevator Company, Farmington, Conn.

[21] Appl. No.: 550,969

[22] Filed: Oct. 31, 1995

[51] Int. Cl.⁶ .................................................. B66B 7/04
[52] U.S. Cl. ........................ 187/409; 187/292; 187/394; 187/401
[58] Field of Search .................. 187/292, 394, 187/409, 401

[56] References Cited

U.S. PATENT DOCUMENTS

| | | |
|---|---|---|
| 4,750,590 | 6/1988 | Otala . |
| 4,754,849 | 7/1988 | Ando . |
| 5,027,925 | 7/1991 | Kahkipuro . |
| 5,193,651 | 3/1993 | Shigeta et al. . |
| 5,294,757 | 3/1994 | Skalski et al. . |
| 5,304,751 | 4/1994 | Skalski et al. . |
| 5,308,938 | 5/1994 | Roberts et al. . |
| 5,321,217 | 6/1994 | Traktovenko et al. . |
| 5,322,144 | 6/1994 | Skalski et al. . |
| 5,329,077 | 7/1994 | Skalski et al. . |
| 5,367,132 | 11/1994 | Skalski et al. . |
| 5,373,123 | 12/1994 | Skalski . |
| 5,379,864 | 1/1995 | Colby . |
| 5,400,872 | 3/1995 | Skalski et al. . |
| 5,439,075 | 8/1995 | Skalski et al. . |
| 5,547,059 | 8/1996 | Wantanabe et al. ............ 187/409 |
| 5,652,414 | 7/1997 | Roberts et al. ............ 187/292 |

FOREIGN PATENT DOCUMENTS

| | | | |
|---|---|---|---|
| 60-36279 | 2/1985 | Japan . | |
| 33888 | 5/1989 | Japan . | |
| 33884 | 1/1991 | Japan . | |
| 351281 | 3/1991 | Japan . | |
| 351285 | 3/1991 | Japan . | |
| 3115076 | 5/1991 | Japan . | |
| 3138280 | 6/1991 | Japan . | |
| 406001560 | 1/1994 | Japan ............................ | 187/409 |
| 7-2456 | 1/1995 | Japan . | |
| 710418 | 1/1995 | Japan . | |
| 72457 | 1/1995 | Japan . | |
| 2262166 | 6/1993 | United Kingdom . | |
| 2262932 | 7/1993 | United Kingdom . | |

OTHER PUBLICATIONS

"A Magnetic Bearing Control Approach Using Flux Feedback" NASA Technical Memorandum 100672, Mar., 1989.
"Attitude Control System of a Super–high Speed Elevator Car Based on Magnetic Guides", H. Inaba, et al, IEEE IECON '94, Bologna, Italy, Sep. 5–9, 1994.

Primary Examiner—William E. Terrell
Assistant Examiner—Khoi H. Tran

[57] ABSTRACT

A contactless slide guide or magnetic bearing for guiding an elevator vertically along a hoistway rail has one or more electromagnet actuators spring-mounted within a yoke attached to the elevator car at a corner thereof. The positioning of the electromagnets within the yoke is such that they are positioned extremely close to the surface of the rail so as to form a magnetic bearing having a gap of just a few millimeters, and which is controlled in a position feedback control loop to keep the gap constant. The contactless slide guide may be used for low-rise buildings with a rigid connection between the yoke and the elevator, or may be used in conjunction with an active suspension system more typically used in mid- to high-rise buildings. The active suspension system may be used, for example, in conjunction with a pendulum car suspended within the elevator frame to which contactless slide guides are attached at the top and bottom. The active suspension is controlled with a feedback control system that is completely separate from the position control loops used to control the individual contactless slide guides.

16 Claims, 9 Drawing Sheets

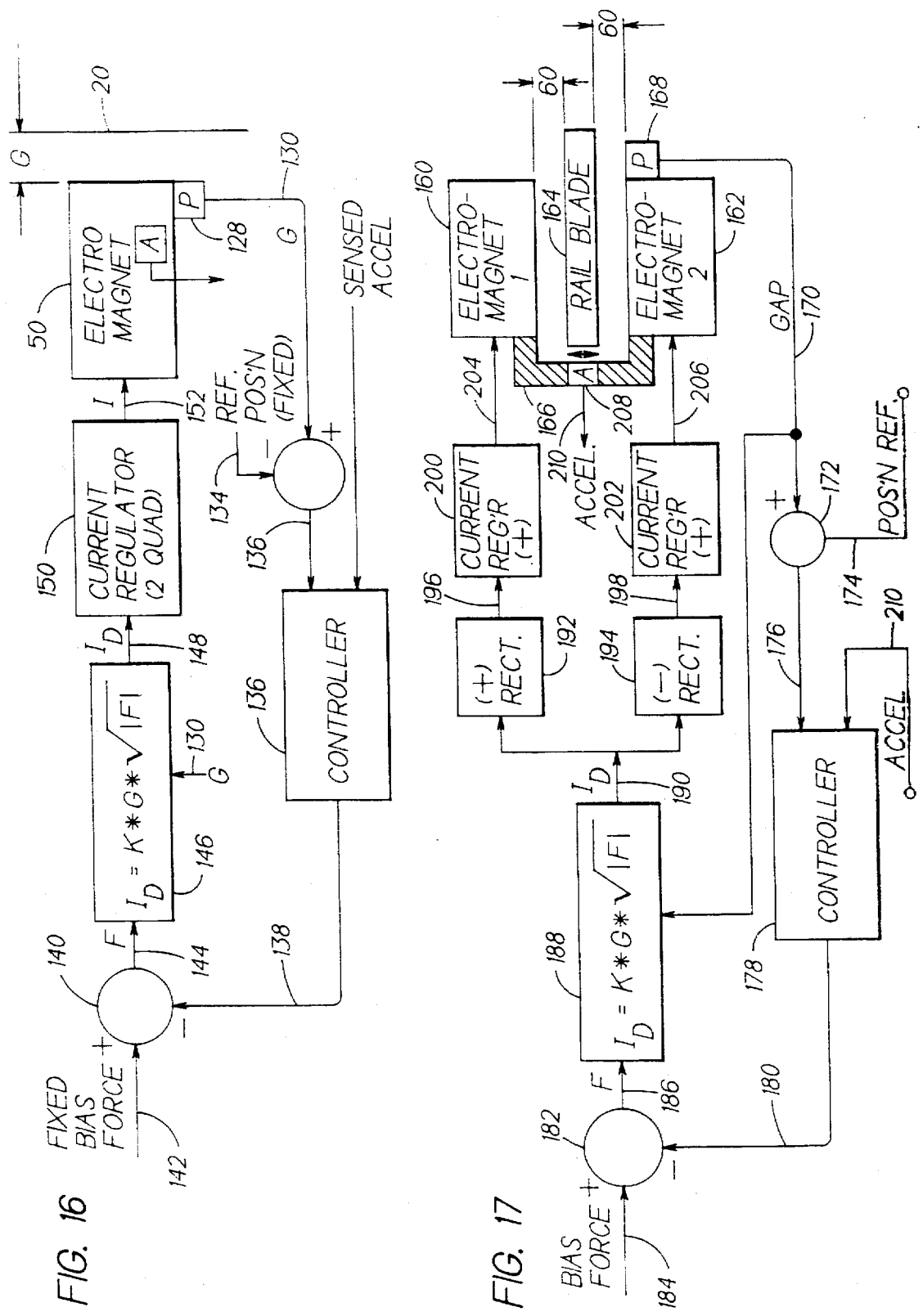

CONTACTLESS SLIDE GUIDE FOR ELEVATORS

TECHNICAL FIELD

This invention relates to elevators and, more particularly, to means for guiding an elevator along a vertical hoistway rail.

BACKGROUND OF THE INVENTION

Slide guides for low-rise elevators have been known for a long time. They typically include a C-shaped outer housing with flat slide pad material mounted on the three inner walls of the C-shaped housing. The housing with the inner pads then fits over the rail blade for sliding engagement therewith.

Unfortunately, by virtue of the sliding contact of the guide shoe with the rail, the noise generated by the guide shoe sliding on the rail is transmitted to the elevator car frame. Similarly, any imperfections in the rail, such as out-of-straightness, both side-to-side and front-to-back, will cause bumpiness and jostling of passengers. This may be ameliorated by the use of springs between the housing and an outer housing.

Active suspension systems have been proposed and are primarily envisioned for use in high- or mid-rise buildings, where roller guides have been utilized in the past, but where the out-of-straightness problem becomes more severe. Because of the relatively great lengths of the hoistway rails in such buildings, the side-to-side distance between rails mounted on opposite sides of the hoistway becomes so severe that changes of as much as ±10 mm can be experienced along the length of the rails in the hoistway.

In regard to active suspension control in the horizontal plane in the front-to-back direction, there is also a problem in that no more than about 4 mm of adjustment is permitted. This is due to the presence of a safety, typically mounted on the "safety plank" comprising car frame steel beams located at the bottom of the car on each side. The safeties typically have a pair of wedges with a small opening called the "safety throat", which is about 27 mm wide. Given that the thickness of the rail blade is about 19 mm, this leaves only about 4 mm of play on either side of the blade. The play in the side-to-side direction is about the same.

Given that the allowable play in both the front-to-back and side-to-side directions is not very much, it would be desirable to increase the amount of stroke available for any active suspension system beyond the few millimeters available presently. This would provide a much better ability to move the elevator car in the horizontal direction with respect to the rails.

Some horizontal active suspension systems for elevators use electromagnets for guiding the elevator along the rails. Because of the large requirements for control of gap variation for such electromagnets due to the wide variations in distance between rails and similar problems in the front-to-back direction, such electromagnets are typically provided for operating with very large gaps, i.e., on the order of 5 mm or greater, in order to provide for the desired range. The greater the gap, of course, the greater the amount of energy required to sustain the magnetic field at the desired levels in the gap. This results in higher costs due to increased copper requirements, increased power supply costs, etc.

DISCLOSURE OF INVENTION

The object of the present invention is to provide a contactless slide guide or magnetic bearing for elevators.

According to the invention, a guide for guiding an elevator vertically along a hoistway rail comprises a housing for connection to a frame of the elevator, a yoke connected to said housing by spring means, electromagnet actuator means connected to the yoke for positioning adjacent the hoistway rail and responsive to an electromagnet drive signal for guiding the elevator vertically along the hoistway rail, a position sensor for sensing a position of the electromagnet with respect to the hoistway rail or for sensing a gap between the electromagnet actuator means and the hoistway rail for providing a sensed gap signal, a controller, responsive to a position or gap reference signal and to the sensed gap signal for providing the electromagnet drive signal to the electromagnet actuator means for maintaining the position or gap constant.

According further to the invention, the gap is maintained constant at less than four millimeters.

According still further to the invention, the guide further comprises an accelerometer to which the controller is responsive for providing the electromagnet drive signal.

In accord with the invention, the electromagnet actuator means comprises first and second electromagnets connected to the yoke for positioning adjacent the hoistway rail on opposite sides of a blade thereof.

In further accord with the invention, the electromagnet actuator means further comprises a third electromagnet connected to the yoke for positioning adjacent a tip of the hoistway rail.

According still further to the invention, the electromagnet actuator or actuators are preferably of the transverse-flux type, rather than of the longitudinal-flux type.

In still further accord with the invention, the electromagnets are C-shaped and are at least five times longer than wide.

Still further in accord with the invention, the electromagnets are shaped to have a same width as a blade of said hoistway rail for alignment therewith, in order to achieve a reluctance force effect which tends to cause self-alignment of the electromagnet and the blade. Alternatively, the electromagnets may be shaped to have a wider width than the blade of the hoistway rail, to obtain a stronger force, but without the above-mentioned reluctance force/self-alignment effect.

According further to the invention, the electromagnets are C-shaped and provided with longitudinal slots for alignment with longitudinal slots in a blade of the hoistway rail.

In accord with the invention, the electromagnet actuator means comprises an electromagnet for positioning adjacent at least one arm extending from a blade of the hoistway rail.

In further accord with the invention, at least one permanent magnet stabilizer is connected to the yoke for positioning adjacent the hoistway rail.

In still further accord with the invention, the hoistway rail has longitudinal slots and wherein said permanent magnet stabilizer is for positioning adjacent said hoistway rail longitudinal slots.

Still further in accord with the invention, the housing is for rigid connection to said frame and wherein said frame is for rigid connection to an elevator car within said frame.

According further to the invention, the housing is for rigid connection to said frame and wherein said frame is for resilient connection to an elevator car within said frame.

According still further to the invention, the resilient connection is a passive device or object having a selected spring constant.

Still further in accord with the invention, the frame is for connection to an elevator car within said frame by means of an active suspension having an actuator for actuating said elevator car with respect to said frame and having a sensor and controller for controlling said actuating in a separate feedback control system.

These and other objects, features and advantages of the present invention will become more apparent in light of the detailed description of a best mode embodiment thereof, as illustrated in the accompanying drawing.

BRIEF DESCRIPTION OF THE DRAWING

FIG. 16 shows a single-sided controller for controlling a single magnetic bearing.

FIG. 17 shows a controller for controlling a double-sided magnetic bearing.

BEST MODE FOR CARRYING OUT THE INVENTION

Figure 1:
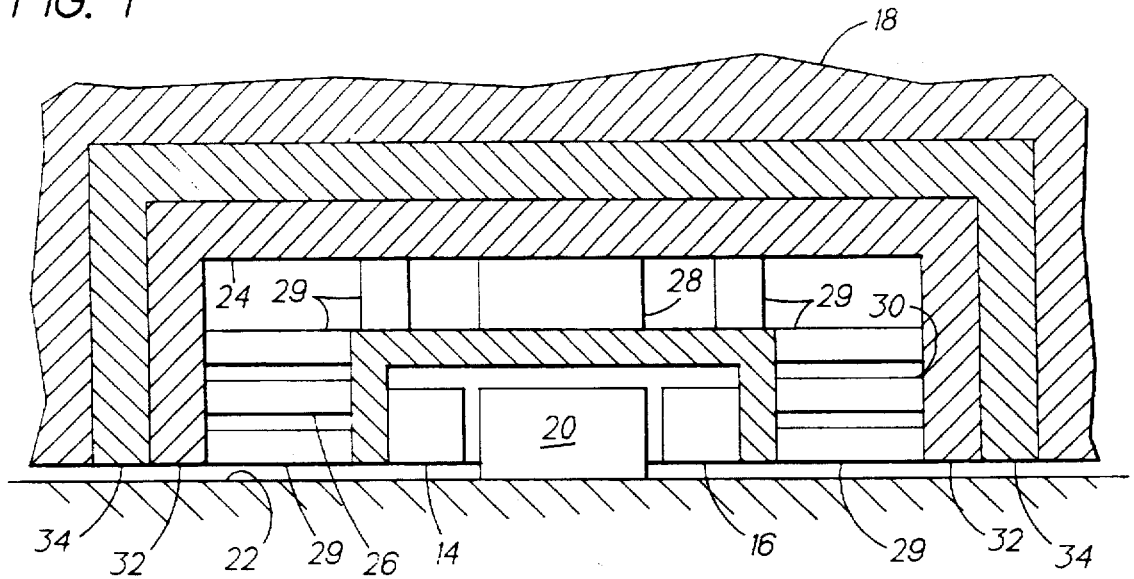
FIG. 1 shows a contactless slide guide or magnetic bearing, according to the invention.

FIG. 1 shows a contactless slide guide, according to the present invention, comprising a yoke having at least one magnet 14, 16 mounted thereon for guiding an elevator car 18 along a rail 20 vertically mounted on a hoistway wall 22.

The yoke 12 is resiliently mounted to a housing 24, e.g., by spring means 26, 28, 30 and/or by slider bearings (not shown) to provide torsional stability. Dampers 29 may be placed at appropriate locations across the springs to suppress resonances, if desired. It should be realized that the springs and dampers may be combined, in whole or in part, in a single means, such as a visco-elastic material that could be used to provide both spring force and damping. The housing 24 may be fixedly mounted to a car frame 32, which is in turn connected to the car 18 by a connection means 34. The connection means 34 may, in whole or in part, be rigid, resilient or may even be an active suspension, as disclosed below.

Figure 2:
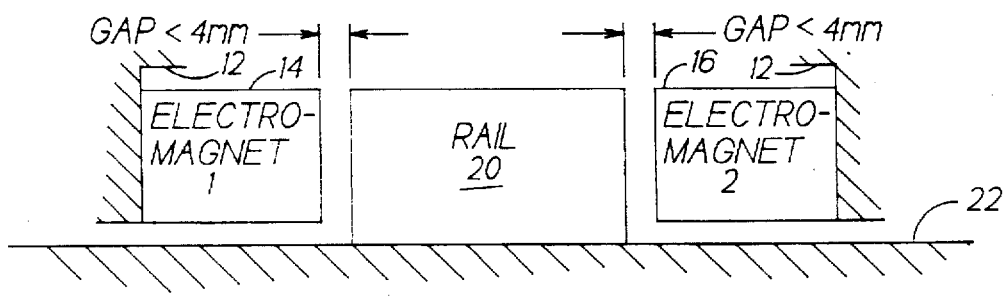
FIG. 2 shows a magnetic bearing gap of less than 4 mm between electromagnets on opposite sides of a hoistway rail, according to the invention.

FIG. 2 shows the rail 20 of FIG. 1 with the magnets 14, 16 illustrated as electromagnets mounted on the yoke 12. According to the present invention, the electromagnets are tightly controlled at a fixed gap of less than 4 mm as shown, and preferably as close to the rail as possible, e.g., on the order of 1 or 2 mm. The electromagnets are controlled at this very narrow gap with a position control system so as to act as magnetic bearings for behaving as contactless slide guides.

This is contradistinction to the prior art slide guides, which actually make physical contact with the rail by sliding thereon. It is also distinguished from the known active suspension systems utilizing magnetic guide heads, since such prior art magnetic guide heads have been used not as more than magnetic bearings. Both centering and vibration isolation of the elevator car are performed in such prior art systems, and as a result, the gap necessarily varies over a wide range in order to compensate for variations in the distance between rails for the side-to-side control axis and for variations in the rail straightness in the front-to-back direction. Unfortunately, the wider the gap, the higher the energy to maintain the flux. For a given magnetic structure and a prescribed force of attraction, the power supplied to the magnet varies as gap squared. There is therefore a very strong incentive to keep the gap as small as possible. Also, magnetic circuit performance is compromised due to fringing that increases with larger gaps. The present invention, on the other hand, uses a position control loop to maintain a constant gap between the rail and the magnet such that the magnet and the yoke exactly follow the rail and its variations as the car moves vertically in the hoistway. The smaller the gap is, the smaller are the energy and copper requirements. In turn, this permits the construction of more compact and easily mounted magnets.

Figure 3:
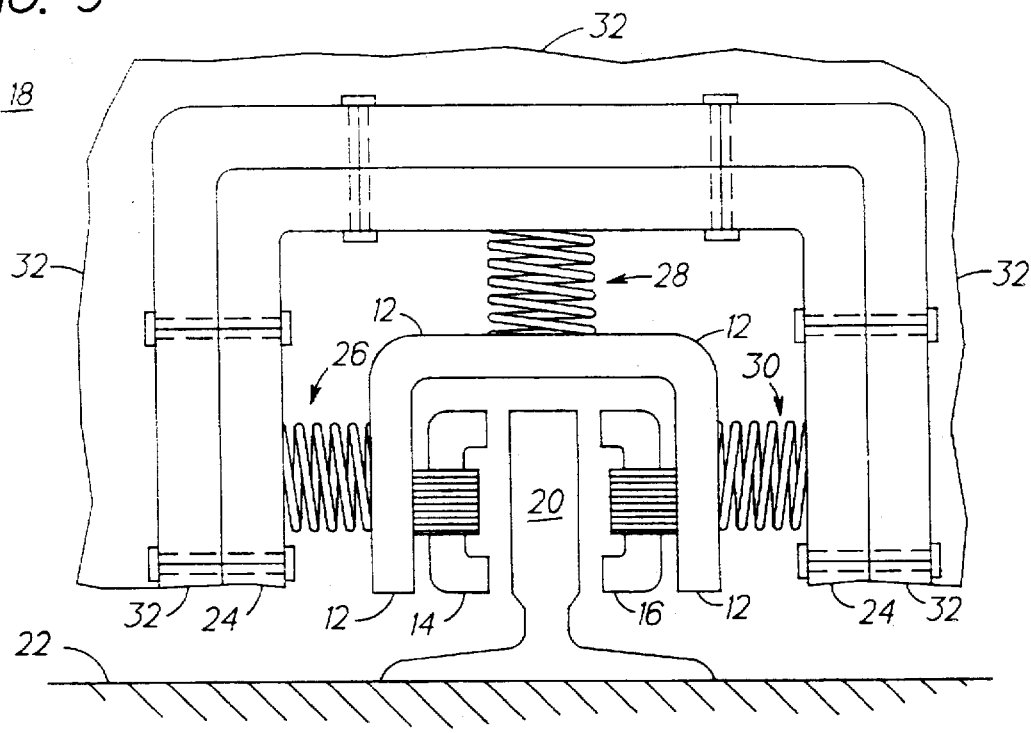
FIG. 3 shows an embodiment of the contactless slide guide of FIG. 1, according to the invention.
Figure 4:
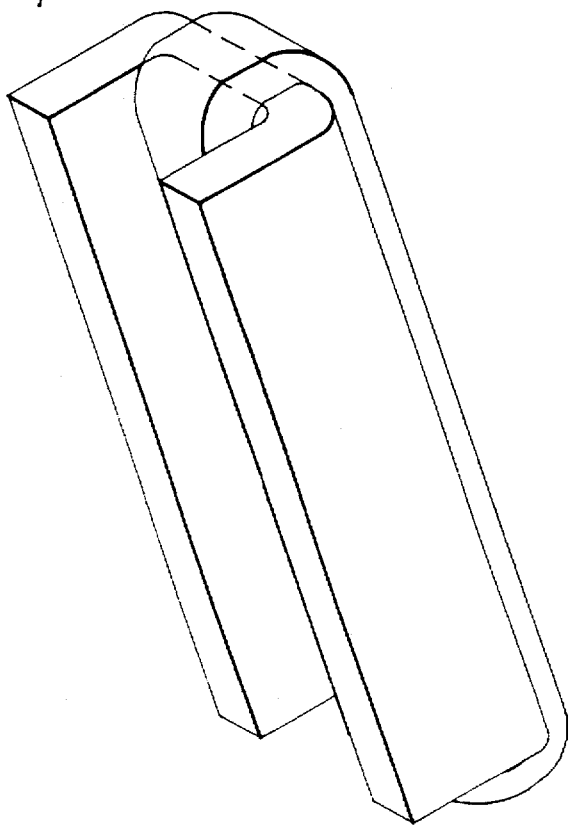
FIG. 4 shows one of the electromagnets of FIG. 3 in perspective.

For example, FIG. 3 shows a pair of electromagnets 14, 16, such as illustrated in FIG. 4, having an elongated C-shaped core with a long winding on an inner leg thereof.

A core having a length considerably longer than its width (e.g., five times longer) and oriented with respect to a T-shaped rail such as shown in FIG. 3, with the C-shape oriented horizontally, provides good, high-speed performance, as already described in connection with FIG. 48 of U.S. Pat. No. 5,294,757, among others. It is to be observed that the active horizontal suspension shown in the above-mentioned U.S. patent, particularly at FIGS. 47–51 thereof, is of the above-mentioned type where the size of the gap is varied as a means of controlling the centering of the car and as a further means of controlling the vibration. As such, the position control loop of the prior art does not use a constant gap command, as is used in the present invention, as will be made clearer below.

The front-to-back springs 26, 30 of FIG. 3 may be helical tension-type springs that are selected to resist a preload or bias force that may be introduced into the control for each of the electromagnets 14, 16, as described below. In other words, a DC bias current may be applied to each of the coils of the electromagnets 14, 16 in order to create an attractive force between each of the electromagnets and the rail, which is equally balanced on each side, but which is also resisted by the springs 26, 30 so as to create a steady-state balance force in the absence of any disturbing forces. Referring back to FIG. 1, the spring means 26, 30 may be of this helical tension-type or some other type, such as a helical compression-type spring, but with the physical relationship between the yoke and the housing different from that shown in FIG. 3. Similarly, as described below in connection with FIG. 8, a side-to-side electromagnet may be introduced within the yoke, and it, too, may be provided with a preload bias force that has to be balanced by the spring means 28. In the absence of such a side-to-side electromagnet, as pictured in FIGS. 1 and 3, on the other hand, the spring means 28 can also be of the helical tension type but may have a different spring rate, as appropriate. As will be made clear below, it may be advantageous for the embodiments shown in FIGS. 1 and 3, i.e., without side-to-side electromagnets, to design the electromagnets in such a way as to take advantage of reluctance forces between the rail and the magnets for side-to-side stabilization. It should also be realized that, as an alternative for the above-described biasing for the front-to-back magnets 14, 16, one could use no DC bias. The springs may then be either compression or tension or neutral, so as to provide a flexible coupling between the guide rails and the car frame.

Figure 5:
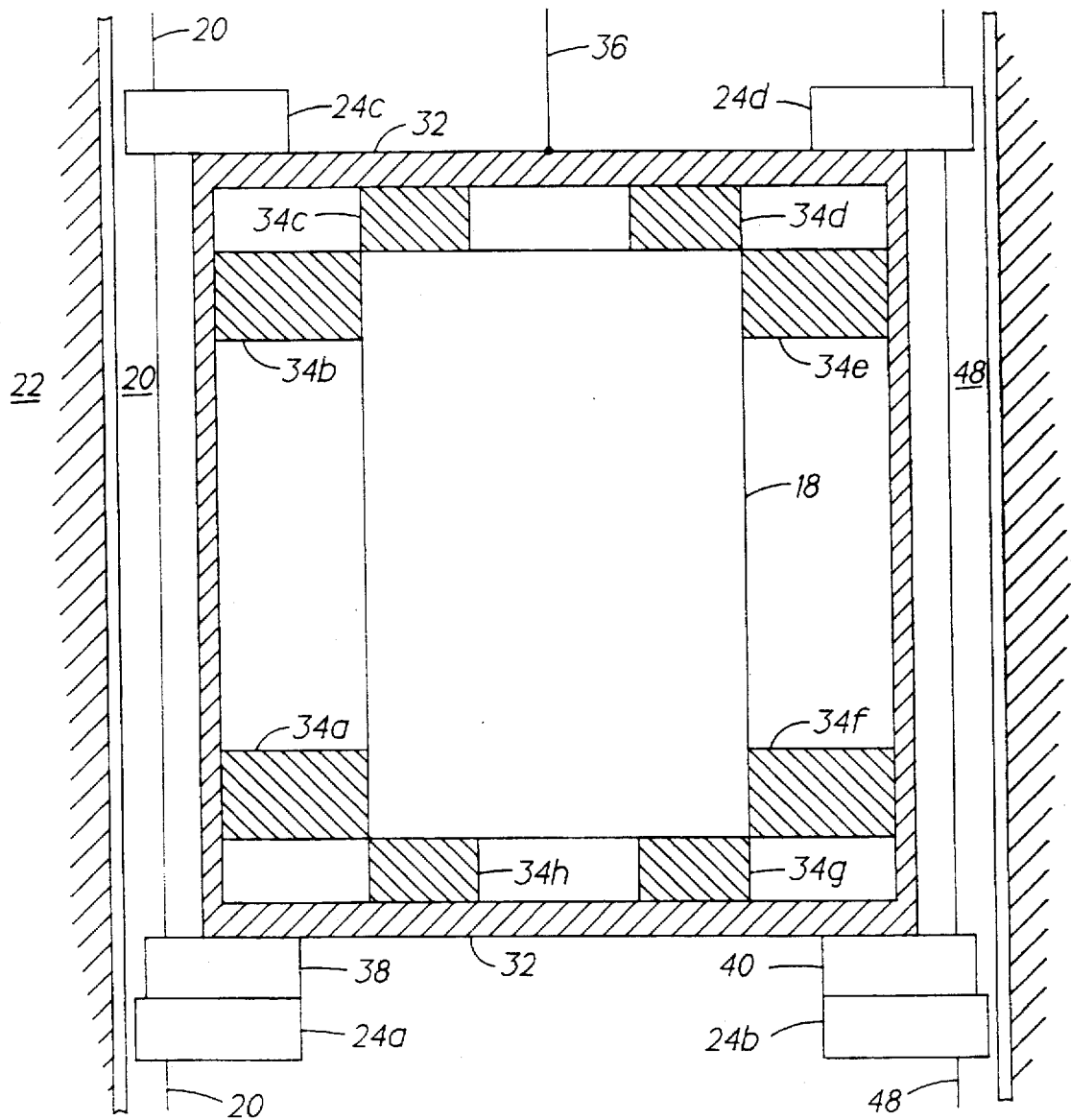
FIG. 5 shows a side sectional view of an elevator car suspended from a hoistway rope and connected to an outer elevator car frame, which is in turn guided along hoistway rails, according to the present invention, by magnetic bearings within housings mounted at the corners of the car frame.

FIG. 5 shows an elevator car 18 having a frame 32 connected to the car by a connection means 34a, 34b, 34c, 34d, 34e, 34f, 34g, 34h. As mentioned, the connection means may be rigid connections, or resilient, either passive or active. A cable 36 may be attached to the frame, as shown, or even to the car by passing the cable through an opening in the frame (not shown).

Figure 6:
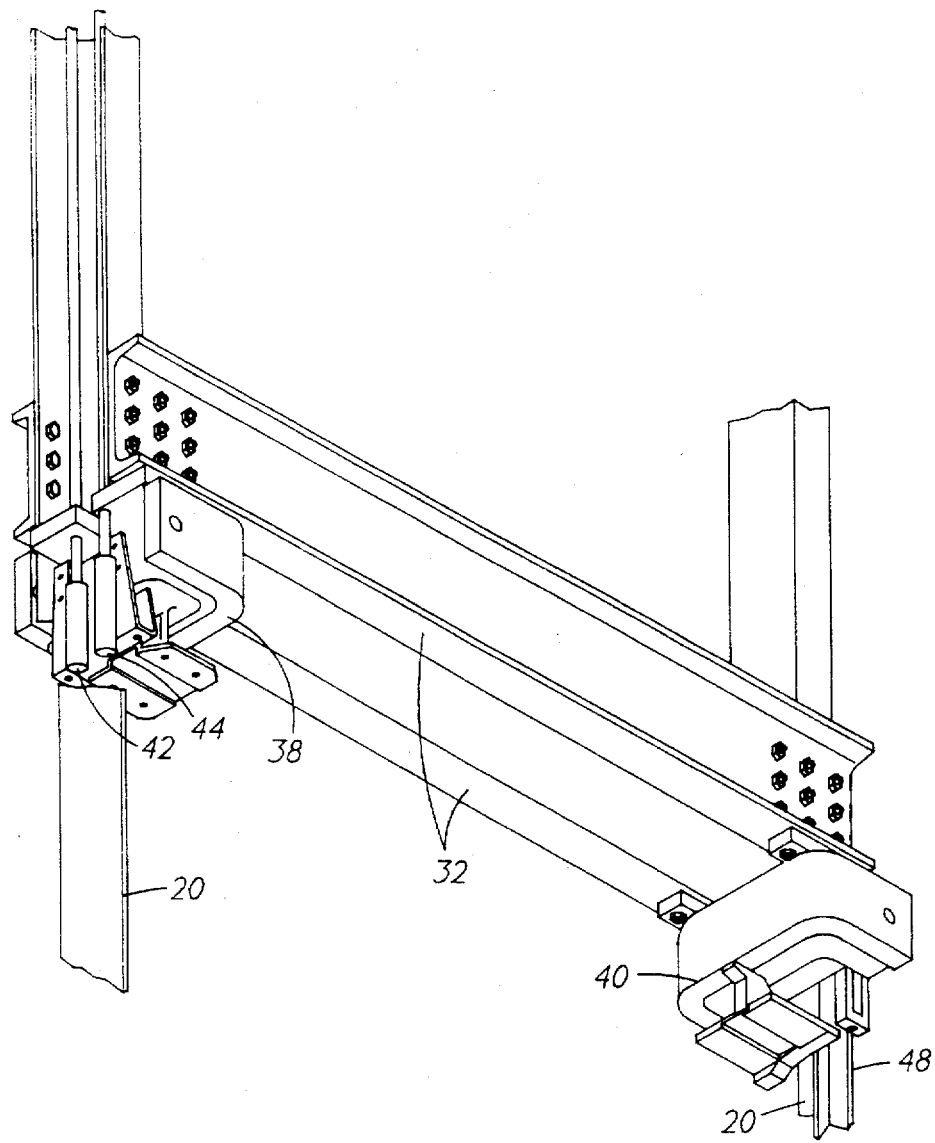
FIG. 6 shows the safety throat of one of the safeties mounted on the bottom of the elevator car frame, according to the prior art.
Figure 7:
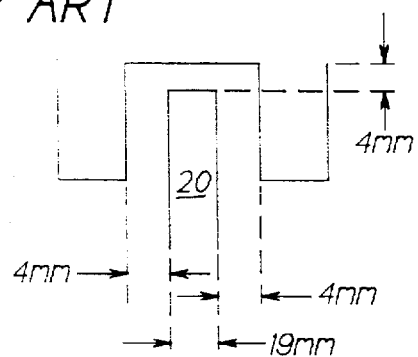
FIG. 7 shows a sectional view of the safety throat of the prior art.

Typically attached to the "safety planks" at the bottom of prior art car frames are a pair of mechanical safeties 38, 40, better shown in FIG. 6, and having a pair of wedges 42, 44, which clamp together on the blade of the rail 20 in the presence of a safety condition to stop the elevator from further movement along the rails. FIG. 7 shows a schematic plan view of the top of the safety, which comprises a top plate having a slot called the "safety throat" within which the blade of the rail 20 is situated. The wedges 42, 44 are situated under the top plate, as may be seen in FIG. 6. The width of the slot or safety throat is only about 27 mm. Given that a typical blade is about 19 mm in thickness, this gives a clearance of only about 4 mm on either side of the blade, as shown for the front-to-back direction. A similar clearance of about 4 mm is available between the tip of the blade and the back of the safety throat, i.e., in the side-to-side direction. Similar clearances are available on an opposite rail 48, shown in FIG. 6. It will be appreciated that, for active suspension systems where the required range of centering control approaches or exceeds 4 mm, the safety throat presents an obstacle.

Referring back to FIG. 5, a plurality of housings 24a, 24b, 24c, 24d may be mounted fixedly onto the car frame for guiding the car along the rails 20, 48. Each housing is similar to the housing shown in FIG. 1, having a yoke resiliently mounted thereto by spring means. Each yoke has at least one magnet 14, 16, as shown in FIG. 1, which may be an electromagnet, as shown in FIG. 2, controlled by means of a position control loop to maintain a constant gap less than 4 mm wide so as to act as a magnetic bearing.

The number of magnets and their positioning inside the yoke and their positional relationship to the rail can vary widely. In addition, the rail shape need not be the standard shape shown in the figures so far, but may take on alternate shapes as shown, for example, in FIGS. 4–7 and 9–13 of U.S. Pat. No. 5,294,757. Most, or even all, of these shapes would be usable for a magnetic bearing as well, using the teachings hereof.

Figure 8:
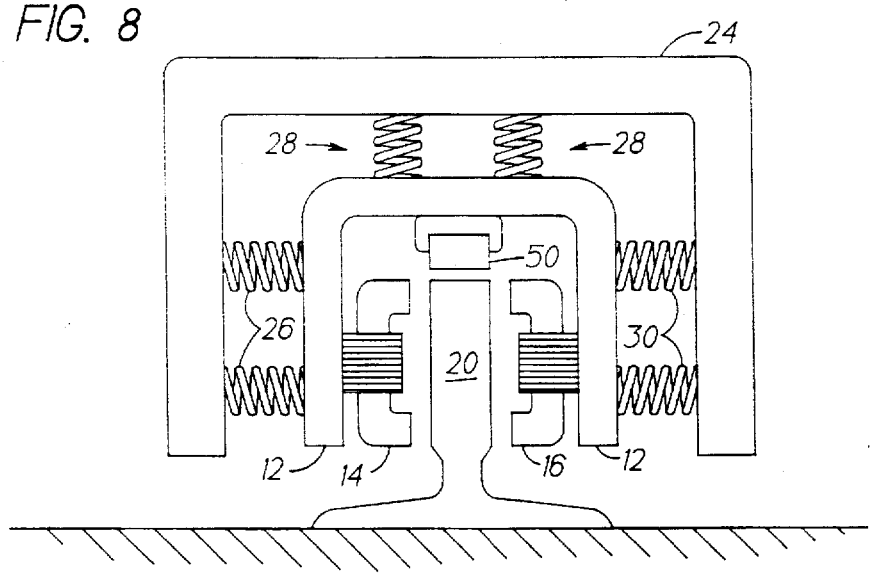
FIG. 8 shows another embodiment of a magnetic bearing, according to the invention.
Figure 9A:
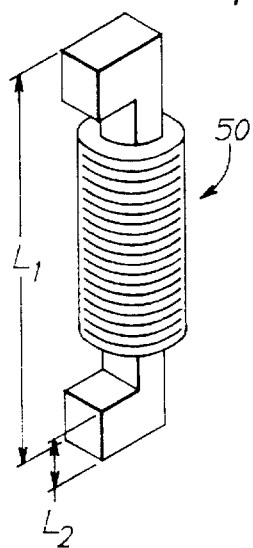
FIG. 9A shows one alternative for the electromagnet of FIG. 8 at the tip of the blade of FIG. 8 in perspective.
Figure 10:
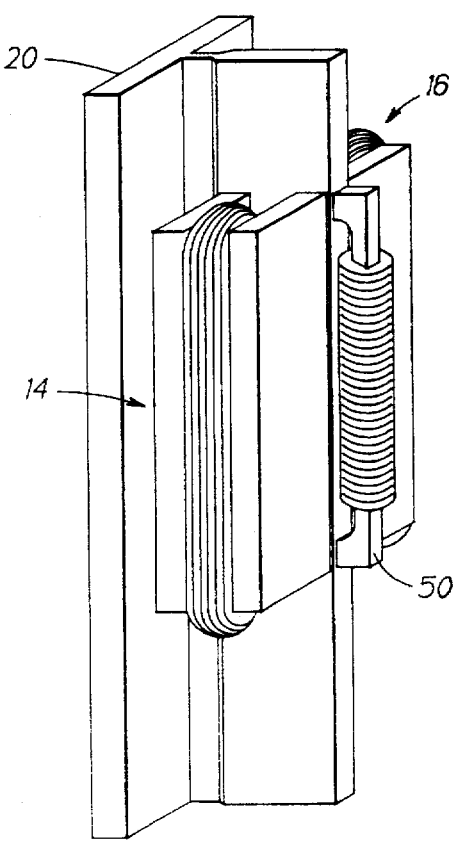
FIG. 10 shows all three of the electromagnets of FIG. 8 in perspective and using the alternative of FIG. 9A and arranged with respect to the hoistway rail, without the yoke, springs or housing being illustrated.

For example, FIG. 8 shows the rail 20 having three magnets associated therewith, two magnets 14, 16 the same as shown already in connection with FIG. 3, but including an additional electromagnet 50 for use as a magnetic bearing in the side-to-side direction of control. Such an additional electromagnet 50 may take the form shown in FIG. 9A, which is further illustrated in perspective in FIG. 10 in relation to the tip of the rail blade. Also illustrated in FIG. 10 are the electromagnets 14, 16 on opposite sides of the rail blade. The yoke 12 is not illustrated in FIG. 10, but has the three electromagnets 14, 16, 50 mounted thereon for keeping said electromagnets in position, as shown.

As illustrated in FIG. 9, the length $L_1$, of the core of the electromagnet 50 should be less than five times $L_2$ to avoid excessive flux leakage.

Figure 9B:
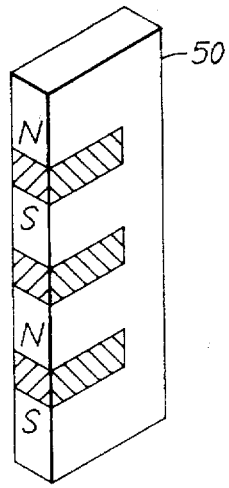
FIG. 9B shows an alternative to the electromagnet 50 of FIG. 9A in the form of an electromagnet having a periodic structure.

FIG. 9B shows an alternative to the electromagnet 50 of FIG. 8. It comprises an electromagnet having a periodic structure with multiple legs extending from a backbone of the core. A coil is wrapped about each leg (pole piece) which are caused to alternate as north and south poles, as shown. This form of the electromagnet 50 would be arranged with the tips of the legs adjacent the tip of the blade, similar to the arrangement shown in FIG. 10 for the electromagnet 50 of FIG. 9A.

Figure 9C:
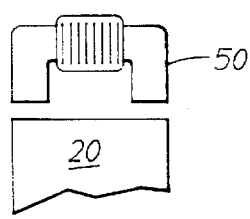
FIG. 9C shows yet another alternative electromagnet structure for use as the electromagnet 50 at the tip of the blade 20 of FIG. 8.

Yet another alternative is shown in FIG. 9C for the electromagnet 50 of FIG. 8, wherein an electromagnet having the structure shown in FIG. 4 would be used at the tip of the blade 20 and arranged in a manner similar to the arrangement shown for the electromagnet 50 of FIG. 9A, as shown in FIG. 10.

Figure 11A:
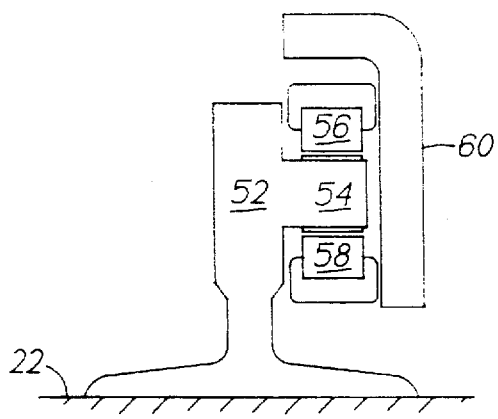
FIGS. 11A and 11B show another embodiment of the magnetic bearing of FIG. 1, according to the invention with side-to-side and front-to-back actuators for use at different levels.
Figure 11B:
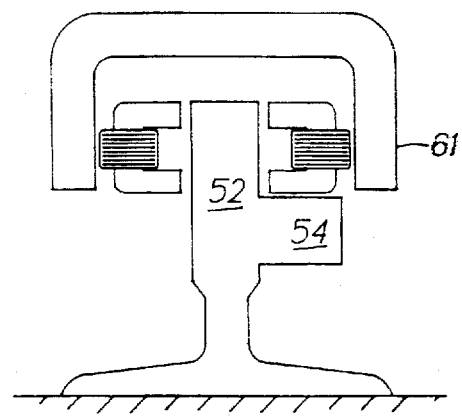
Figure 11C:
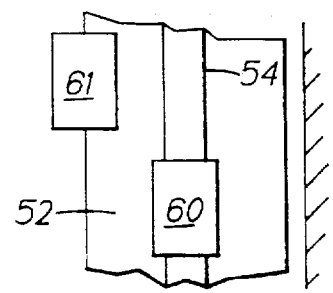
FIG. 11C shows the side-to-side and front-to-back actuators of FIGS. 11A and 11B positioned at different levels.

FIGS. 11A and 11B show yet another variation of FIG. 1, with a non-traditionally shaped rail 52 having an arm 54 emerging from one of the faces of the blade. At one vertical level, on opposite sides of the arm 54 are a pair of electromagnets 56, 58 mounted to a yoke 60 that mechanically supports them and positions them with respect to the arm 54. This is for side-to-side control. The electromagnets 56, 58 may take the form of the electromagnet 50 shown in FIG. 9, for example. Alternatively, only one electromagnet, e.g., the electromagnet 56, may be used on only one side of the arm 54 as a single-sided magnetic bearing. In FIG. 11C, the yoke 60 of FIG. 11A is shown in a side view of the rail, also showing another yoke 61 at a slightly different level, as shown in plan view in FIG. 11B. The yoke 61 is for front-to-back control. The two yokes 60, 61 would be used in conjunction with each other for controlling side-to-side and front-to-back motions, respectively. It is possible that they could be put at the same level by moving the projection 54 closer to the base of the rail in order to give more room for the yoke 61 on the blade 52.

Figure 12:
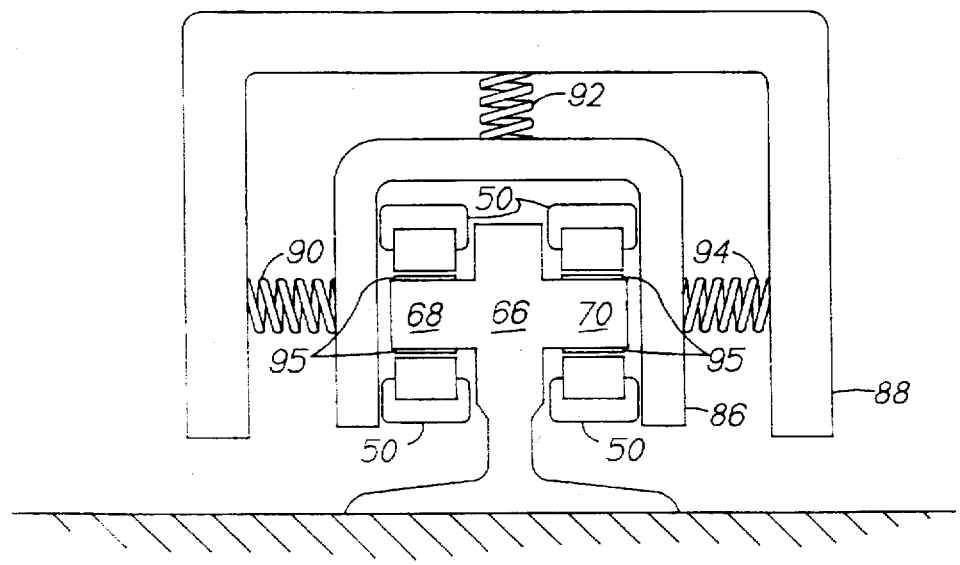
FIG. 12 illustrates yet another embodiment of a magnetic bearing, according to the invention.

FIG. 12 shows that arms 68, 70 of a non-conventional rail 66 can be used for a double-sided side-to-side configuration, i.e., a double-sided variant of FIG. 11A, with four electromagnets similar to the electromagnet 50 of FIG. 9 oriented as shown within a yoke 86 connected to a housing 88 by means of springs 90, 92, 94, and dampers (not shown), if desired. In the case of FIG. 12, another housing adjacent to the housing 88, but at a different level, can be used for control in the front-to-back direction. Such could take the form as shown in FIG. 11B, for example. It would even be possible to avoid the use of a separate front-to-back actuator by putting raised plateaus 95 on the faces of the arms 68, 70, which would have the same shape as the faces of the cores of the electromagnets and would be aligned therewith for taking advantage of reluctance forces between the plateaus and the faces of the electromagnet cores.

Referring back to FIGS. 3 and 8, it will be observed that the front-to-back magnets 14, 16 have their outer edges aligned with the edges of the blade. By aligning these edges in the manner shown, the magnetic flux lines emanating from the electromagnets tend to cross the gap and enter the blade in a direction perpendicular to the surface of the blade at the edge. As a result, any force tending to move the yoke in the side-to-side direction is resisted by reluctance forces created by these straight flux lines. In some cases, the effect may be strong enough to permit the electromagnet 50 of FIG. 8 to be omitted entirely, as shown in FIG. 3, for example.

Figure 13:
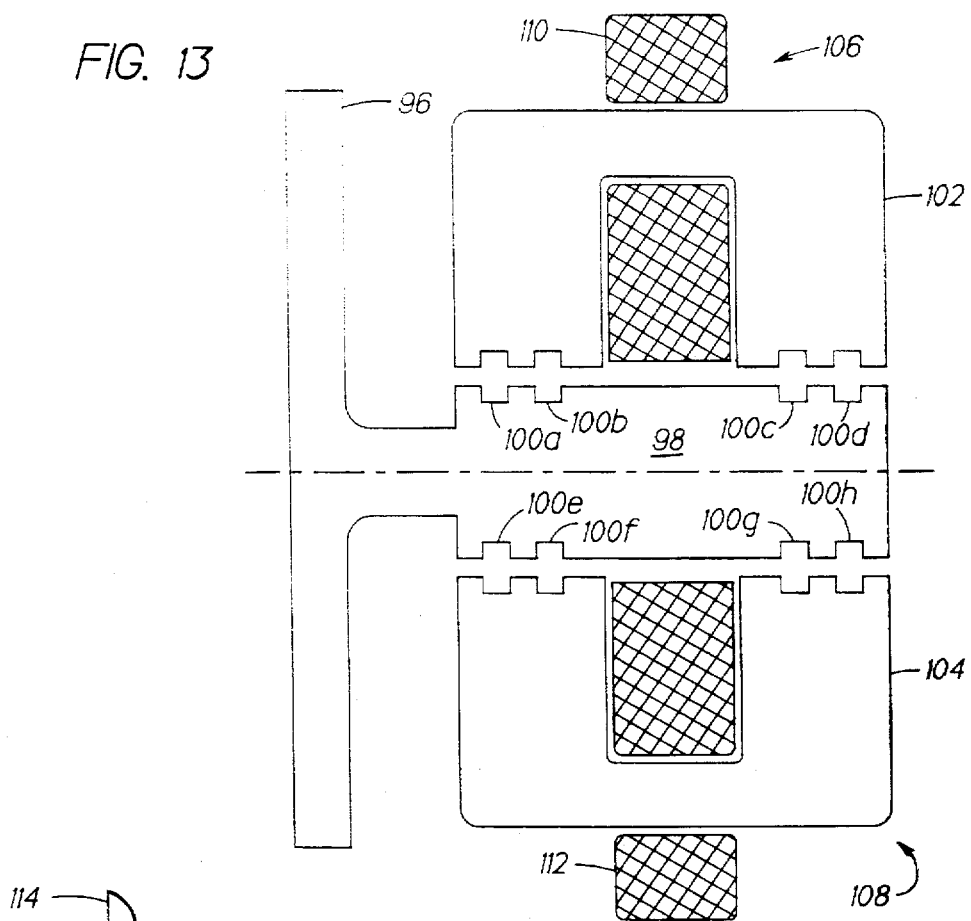
FIG. 13 shows a contactless slide guide or magnetic bearing for use with a non-conventional rail having longitudinal channels or slots cut in the opposite faces of the blade and also in the faces of the cores for alignment with the slots of the blade for enhancing reluctance forces that can help suppress side-to-side movement and vibrations.

The effect can be enhanced by shaping the rail in non-conventional ways. For example, FIG. 13 shows a non-conventional rail 96 having a blade 98 with longitudinal slots 100a, 100b, 100c, 100d cut along the entire length of one side of the rail blade face, and a similar set of slots 100e, 100f, 100g, 100h cut longitudinally in the opposite face of the blade 98. If the cores 102, 104 of a pair of electromagnets 106, 108, respectively, are cut with similar longitudinal slots in facing alignment with the slots in the blade, the reluctance forces will be enhanced and thereby reduce the need for any magnetic bearing or contactless slide guide in the side-to-side direction. The electromagnets 106, 108 can take the form of the electromagnet shown in FIG. 4, as described above, with coils 110, 112 wound on the inner arm of the C-shaped cores 102, 104.

The example of FIG. 13 is not exhaustive, and many other examples can be devised by those of skill in the art according to the teachings hereof.

Figure 14:
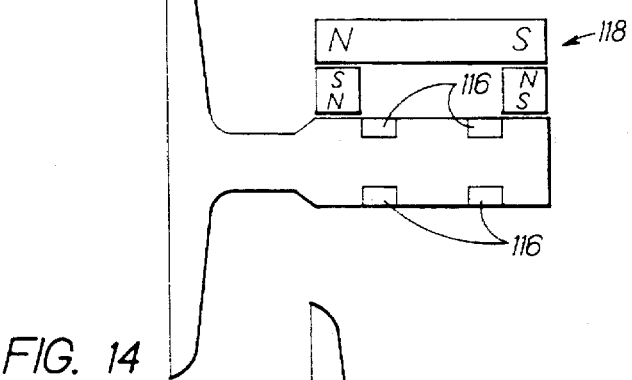
FIG. 14 shows another non-conventional rail with slotted grooves in the longitudinal direction on both sides of the blade for interfacing with a magnet, such as a permanent magnet, arranged as shown on only one side, with the realization that the same would be done on the other side.

For example, as shown in FIG. 14, reluctance forces strong enough to serve in the side-to-side direction can be created using permanent magnets in relation to a conventional T-rail 114 or, optionally, a conventional T-rail with longitudinal slots or grooves 116 to enhance performance. A permanent U-magnet or bar magnet with pole fields, or two bar magnets with a link bar, as shown, can be mounted in a yoke on one side or both sides of the rail blade at a level different from the housing for the magnetic bearing of FIG. 5. In other words, the permanent magnets could be mounted just below the housings 24a and 24b of FIG. 5 and just above the housings 24c and 24d, for example.

Figure 15:
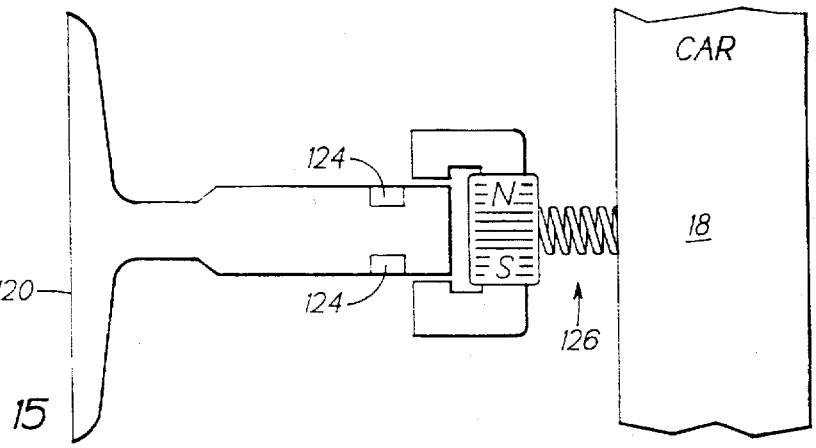
FIG. 15 shows still another non-conventional rail set up with slots to enhance reluctance forces using a permanent magnet attached to the car by means of a spring.

Still another permanent magnet approach is shown in relation to a standard rail 120 in FIG. 15 having a bar magnet with pole pieces at either end oriented as shown in relation to the tip of the blade of the rail 120. Performance can be enhanced by providing longitudinal slots 124 along the entire length of the blade. Again, the permanent magnets can be mounted in a yoke which, in turn, is attached to the car, either fixedly or by means of a spring 126.

Referring now to FIG. 16, a single-sided magnetic bearing controller for controlling an electromagnet, such as the electromagnet 50 of FIGS. 8–10, is shown. The tip of the rail 20 is shown separated from the electromagnet 50 by a small gap on the order of less than 4 mm, and preferably on the order of about 1 or 2 mm. The electromagnet has a position sensor 128 associated therewith for sensing the magnitude of the gap and providing a sensed gap signal on a line 130 to a summing junction 132, where it is summed with a reference position signal on a line 134, which may be viewed as a constant command signal ordering a gap of 1 mm, for example. A different signal on a line 136 is provided to a controller 138 having compensation means therein for providing a control signal on a line 138 to a summing junction 140 that sums a bias force signal on a line 142 to the control signal on the line 138. The bias force signal on the line 142 is for introducing the preload previously discussed. It causes the electromagnet 50 to exert a background attractive force with respect to the rail 20, which can be resisted by a spring, such as the spring means 28 of FIG. 1. Such a spring can be of any suitable type, including, but not limited to, helical tension or compression springs, according to the mechanical design, as explained above.

A summed signal on a line 144 is provided to a computational block 146 for computing a current ($I_D$), which is computed based on a constant x the sensed gap x the square root of the absolute value of the summed force signal on the line 144. The computational block 146 provides an output signal on a line 148 to a current regulator 150, which may be a two-quadrant current regulator, as known in the art, for providing a regulated current on a line 152 to the electromagnet 150.

The above-described position control loop can be used to control the electromagnet so as to act as a contactless slide guide or magnetic bearing which rides at a constant distance on the order of just a few millimeters or less on the rail 20.

The controller 138 may use an acceleration feedback loop through a very lowpass filter. The classic magnetic bearings use only position feedback, but the elevator application permits the use of accelerometer-derived feedback to enhance performance and reduce cost. Therefore, the illustrated magnetic bearing uses accelerometer feedback, but it shall be understood that such can be done without one also.

The transfer function (H) of the controller 136 of FIG. 16 may take a form as follows:

$$H = \frac{k_a s^2}{(t_a s + 1)} + k_s + \frac{k_p}{(t_p s + 1)}.$$

The position feedback constant $k_s$ controls the spring rate at high frequencies, the constant $k_p$ controls static spring rate, and the time constant $t_p$ controls the frequencies where static feedback is cut off. The constant $k_a$ divided by the time constant $t_a$ controls the damping. The constant $t_a$ is chosen to be longer than most system time constants. Relatively high static spring rates in the bearings must be achieved. The necessary minimum rates are 300 N/mm for the front-to-back bearings and 400 N/mm for the side-to-side bearings.

The bearing model is simply a second-order system having no mechanical damping, with an elevator "plant" transfer function (G) of:

$$G = \frac{1}{ms^2}.$$

The effective mass (m) is taken, for example, as one tonne (1,000 kg). Length units are mm when mass is in tonnes. Force units are Newtons.

The constant $k_s$ is computed as $m^*\omega_0^2$. $\omega_0 = 2\pi f_0$. The position feedback filter has a time constant $t_p=30$ s. The gain of the position feedback filter $k_p$ is a parameter. $k_p + k_s$ determine the static stiffness of the bearing in N/mm. $k_p$ is much greater than $k_s$. Thus $k_p$, for the most part, determines static stiffness.

Damping is obtained by feeding back acceleration through a very lowpass filter. A gain $k_a=100$ (N/(mm/s$^2$)) and a time constant of $t_a=10$ s may be used for the acceleration filter.

Analysis shows that with $k_p$ in the range 500–2000, the dynamic performance is acceptable. The use of a very low cutoff frequency for most of the position feedback works well. Dynamic response is acceptable, and problems with structural resonances are avoided.

FIG. 17 shows a way to control two electromagnets 160, 162 on opposite sides of a rail blade 164, so as to maintain a constant gap (G) between each electromagnet 156, 162 and the blade 164. The electromagnets are shown connected by a yoke 166. One or both electromagnets 160, 162 may have an associated position sensor 168 for sensing the gap (G) and providing a sensed gap signal on a line 170 to a summing junction 172, where it is compared to a position reference or command signal on a line 174. The position reference signal commands the desired constant gap. A difference signal on a line 176 is provided to a controller 178 similar to the controller 136 of FIG. 16. A control signal is provided by the controller on a line 180 to a summer 182, which adds a bias force signal on a line 184 to the control signal 180 for providing a force signal on a line 186 to a current controller 188, which provides a current command signal on a line 190 to positive and negative rectifiers 192, 194. These, in turn, provide rectified signals to current regulators 200, 202, which in turn provide the control currents for the electromagnets 160, 162 on respective lines 204, 206.

As for the single-sided magnetic bearing control of FIG. 16, an accelerometer 208 may be included and mounted, for example, as shown on the yoke 166 for sensing front-to-back accelerations, as indicated on an acceleration signal line 210 provided to the controller 178.

Referring back to FIG. 5, it will be realized that, according to the invention, the magnetic bearings or contactless slide guides within the housings 24a, 24b, 24c, 25d, with at least position control loops can be used on low-rise buildings or high-rise buildings, with or without active suspension. For instance, for an inexpensive low-rise building, where active suspension may not be desired, the connection 34 between the car 18 and frame 32 may be rigid or selected from among various passive resilient connection methods. For instance, the connections 34a-34h shown in FIG. 5 may be springs, elastomers, rubber mountings, or the like.

Similarly, for a high-rise building or even a low-rise building where active suspension is desired, the connections 34a-34h may be selected from among various known active suspension methods and devices. For example, FIG. 14 of U.S. Pat. No. 5,322,144 shows a pendulum car suspended within a frame, which is in turn suspended from a hoistway rope, wherein an active suspension system is inserted between the bottom of the car and the floor of the car frame for horizontally actuating the car with respect to the frame to keep the car centered and to suppress vibrations. Such an active suspension system can be implemented in FIG. 5, as the connection between the car and frame 34g, 34h. The other connections 34a, 34b, 34c, 34d, 34e, 34f can be some other form of active or passive connection, or be omitted. Or, the connections 34a, 34f could be made active suspensions of a selected type for the case where the car 18 is suspended within the frame and the frame is suspended from the hoistway rope.

Figure 18:
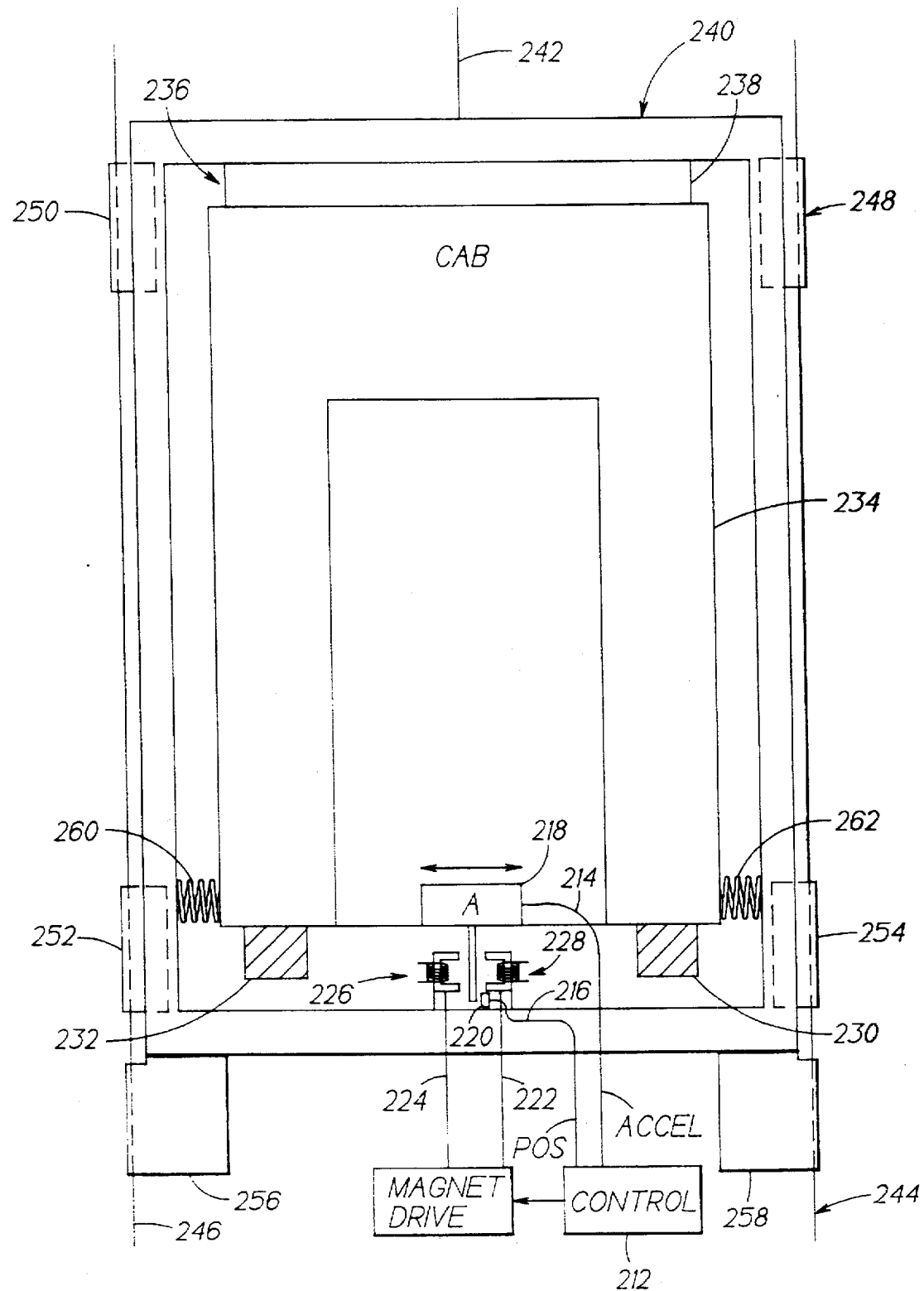
FIG. 18 shows a single axis active suspension controller for use with an active suspension.

As illustrated in FIG. 18, the connections 34g, 34h of FIG. 5 may indeed be by active suspensions, as shown, e.g., at FIG. 14 of U.S. Pat. No. 5,322,144. In the case illustrated in FIG. 18, a controller 212 is responsive to various sensed signals 214, 216 from various sensors 218, 220 for providing control signals on lines 222, 224 to a pair of electromagnet actuators 226, 228 on opposite sides of a reaction plate for controlling the side-to-side position of the car within the frame, and for suppressing vibrations. The sensors 218, 220 may include acceleration and position sensors, respectively, for sensing in the side-to-side axis.

The combined centering vibration control so far shown in FIG. 18 controls the side-to-side axis. Similar controls (not shown) with similar electromagnets and sensors are oriented with respect to additional reaction plates 230, 232 for the front-to-back axis and control of rotation about the vertical axis. The active suspension controls a cab 234 with respect to a frame 250. The cab 234 is suspended by suspension means 236, 238 from the frame 250. A rope 242 is attached to the frame, and suspends the elevator frame within the hoistway for vertical movement therein with respect to rails 244, 246, as guided by magnetic slide guides 248, 250, 252, 254, according to the present invention. Safeties 256, 258 are mounted at the bottom of the car, as shown in FIG. 6. Optional helical centering springs 260, 262 may be provided near to bottom of the cab, as shown.

The controller 212 in FIG. 18 may be similar to the controller of FIG. 19 of U.S. Pat. No. 5,322,144, including a digital part responsive to sensed acceleration signals and gap signals for providing various force command signals to a plurality of analog controllers for providing control current to electromagnet actuators, as shown in FIG. 20 of U.S. Pat. No. 5,322,144. The control scheme for the digital controller is shown in FIG. 18 of the aforementioned patent, all of which is described beginning at column 9, line 1, through column 10, line 43, and continuing at column 13, line 51, through column 20, line 7, which is hereby incorporated by reference.

Similarly, the connections 34g, 34h of FIG. 5 may take forms other than shown in FIG. 14 of U.S. Pat. No. 5,322, 144. For example, U.S. Pat. No. 5,308,938 shows another pendulum car with electromagnets positioned between the safety planks and the underside of the car. This is described in conjunction with a controller therefor, together shown in FIGS. 13 and 14 and described beginning at column 7, line 6, through column 8, line 27, which is hereby incorporated by reference. It should be noted that the controller 212 of FIG. 21 is a completely separate feedback control system from that shown in FIGS. 19 or 20 hereof.

There are, of course, various other combinations of connection methods for the connections 34 of FIG. 5, according to the teachings hereof, including all of them being active suspensions of various known types or various combinations of active and passive suspension connections.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A guide system for guiding an elevator car vertically along a hoistway rail, comprising:

a housing connected to a frame of said elevator;

a yoke, connected to said housing by spring means;

electromagnet actuator means connected to said yoke for positioning adjacent said hoistway rail and responsive to an electromagnet drive signal for said guiding said elevator car vertically along said hoistway rail;

a position sensor for sensing a position of said electromagnet with respect to said hoistway rail or a gap between said electromagnet actuator means and said hoistway rail for providing a sensed gap signal;

a controller, responsive to a position or gap reference signal and to said sensed gap signal for providing said electromagnet drive signal to said electromagnet actuator means for maintaining said gap constant.

2. The guide of claim 1, wherein said gap is maintained constant at less than four millimeters.

3. The guide of claim 1, further comprising an accelerometer to which said controller is responsive for providing said electromagnet drive signal.

4. The guide of claim 1, wherein said electromagnet actuator means comprises first and second electromagnets connected to said yoke for positioning adjacent said hoistway rail on opposite sides of a blade thereof.

5. The guide of claim 4, wherein said electromagnet actuator means further comprises a third electromagnet connected to said yoke for positioning adjacent a tip of said hoistway rail.

6. The guide of claim 4, wherein said electromagnets are C-shaped and are at least five times longer than wide.

7. The guide of claim 4, wherein said electromagnets are shaped to have a same width as a blade of said hoistway rail for alignment therewith.

8. The guide of claim 7, wherein said electromagnets are C-shaped and provided with longitudinal slots for alignment with longitudinal slots in a blade of said hoistway rail.

9. The guide of claim 4, wherein said electromagnets are C-shaped and provided with longitudinal slots for alignment with longitudinal slots in a blade of said hoistway rail.

10. The guide of claim 1, wherein said electromagnet actuator means comprises an electromagnet for positioning adjacent at least one arm extending from a blade of said hoistway rail.

11. The guide of claim 1, further comprising at least one permanent magnet stabilizer connected to said yoke for positioning adjacent said hoistway rail.

12. The guide of claim 11, wherein said hoistway rail has longitudinal slots and wherein said permanent magnet stabilizer is for positioning adjacent said hoistway rail longitudinal slots.

13. The guide of claim 1, wherein said housing is for rigid connection to said frame and wherein said frame is for rigid connection to said elevator car within said frame.

14. The guide of claim 1, wherein said housing is for rigid connection to said frame and wherein said frame is for resilient connection to said elevator car within said frame.

15. The guide of claim 14, wherein said resilient connection is a passive device or object having a selected spring constant.

16. The guide of claim 1, wherein said frame is for connection to said elevator car within said frame by means of an active suspension having an actuator for actuating said elevator car with respect to said frame and having a sensor and controller for controlling said actuating in a separate feedback control system.

* * * * *